2,963,343
Patented Dec. 6, 1960

2,963,343

METHOD OF SEPARATING MOLYBDENUM AND TUNGSTEN VALUES FROM LEACH LIQUORS

Roger L. Pilloton, Niagara Falls, and Philip H. Crayton, Tonawanda, N.Y., assignors to Union Carbide Corporation, a corporation of New York No Drawing. Filed Dec. 9, 1957, Ser. No. 701,288

5 Claims. (Cl. 23—23)

This invention relates to the separation of molybdenum impurities from tungsten leach liquors.

In the recovery of tungsten from its ore by leaching processes, tungsten is solubilized and dissolved in the leach liquor as sodium tungstate. Molybdenum, a customary component of tungsten ores, is also solubilized and dissolved in the leach liquor as sodium molybdate.

In order to recover the molybdenum from the leach liquor, and to purify the tungsten, the leach liquor is acidified with sulfuric acid and treated with sodium bisulfide (NaSH) whereby molybdenum is precipitated from the solution as molybdenum sulfide. This sulfide is impure; additional processing is required to convert the molybdenum to a more useable form. Furthermore, from about 0.3 percent by weight to 1.0 percent by weight of molybdenum still remains in the leach liquor.

It is an object of this invention to provide a method for removing molybdenum from tungsten leach liquors wherein the molybdenum is recovered in a useful form.

It is another object of the invention to provide a process for recovering tungsten from molybdenum leach liquors wherein a higher degree of molybdenum recovery is obtained than was previously possible.

Other objects will be apparent from the disclosure and appended claims.

The process which satisfies the objects of the invention comprise the steps of adjusting the soluble silicon content of the leach liquor so that the mole ratio of the soluble silicon to the molybdenum and tungsten content of the solution is at least 1 to 12 and adjusting the fluoride content of the solution so that the mole ratio of soluble fluoride to soluble silicon in the leach liquor is at least 6 to 1, acidifying the leach liquor with a strong mineral acid to produce a solution having a pH below about 6, contacting the acidified solution with a substantially water-immiscible organic solvent selected from the group consisting of lower aliphatic ketones and lower aliphatic esters whereby tungsten values are transferred from the aqueous solution to the organic solvent, and separating the pregnant organic solvent from the aqueous solution. Following this procedure substantially all of the tungsten is transferred to the organic solvent in a very pure state with the molybdenum and other impurities remaining in the aqueous phase.

The soluble silicon and soluble fluoride must be added prior to acidification. If the silicon is not present before the acidification the tungsten and molybdenum values will precipitate. If the fluoride is not present the soluble silicon will precipitate as silica upon acidification. The soluble silica may be added as a silicate and the soluble fluoride introduced as a fluoride salt. However, the silicon and fluoride are more conveniently and more effectively added as a soluble silicofluoride, for example, sodium silicofluoride, $Na_2SiF_6$ or potassium silicofluoride, $K_2SiF_6$.

The mineral acids which are suitable for reducing the pH of the solution to below 6 include hydrochloric acid, sulfuric acid and phosphoric acid. The extraction may be made more effective by increasing the acidity of the solution until it is at least about two normal in hydrogen ion.

Sodium carbonate solutions are commonly employed as the leaching solution for the tungsten ores. Since excess sodium carbonate is generally employed in the leaching, the leach liquor will also contain dissolved sodium carbonate.

For maximum efficiency of separation the sodium carbonate should be removed from the leach liquor prior to the acid treatment. Several advantages accrue from such preliminary treatment. First, the sodium carbonate may be reused in subsequent leaching processes, and second, in the acidification treatment of the molybdenum-tungsten separation, less acid is required. If the sodium carbonate remains in solution, much of the acid will be used up in neutralizing and decomposing the sodium carbonate. The sodium carbonate may be advantageously removed from the leach liquor according to the process described and claimed in copending application Serial No. 701,286, filed concurrently herewith.

Examples of the organic extracting solvents which are substantially water-immiscible and are suitable for use in the present invention include methylisobutyl ketone, diisobutyl ketone, butyl formate and propyl acetate.

The separation of the molybdenum and tungsten values may be increased several-fold by reducing the molybdenum to the pentavalent state prior to contacting the acidified leach liquor with the organic solvent. This may be accompanied, when necessary, by the addition of iron powder to the leach liquor. The molybdenum values are preferentially reduced to the pentavalent state. The molybdenum values in the pentavalent state are much less extractable by the organic solvents than when in the hexavalent state. However, care should be exercised not to add an excess of iron powder over that necessary to reduce the molybdenum, or tungsten will also be reduced. If the tungsten is also reduced, the advantage gained by the molybdenum reduction will be mitigated.

Attempts to separate sodium tungstate from solution by contacting it with a ketone, when no silicon was present in the sodium tungstate solution, produced no substantial separation.

In a similar test wherein a 6 percent sodium tungstate aqueous solution which was 2 normal in hydrogen ion was treated with potassium silicofluoride in an amount sufficient to produce a solution having a mole ratio of soluble silicon to tungsten of 2 to 3, hexone was employed as the organic solvent. A distribution factor of 16.0 was achieved, that is, the ratio of percent tungsten in the organic phase to percent tungsten in the aqueous phase was 16.0.

When iron powder was added to a solution having a composition identical to the one just described, which solution was then contacted with hexone, a distribution factor of only 2.0 was obtained because of the reduction of the tungsten to the pentavalent state.

An aqeous solution containing 1 percent sodium molybdate and sufficient potassium silicofluoride to produce a silicon-molybdenum mole ratio of 2 to 3, which solution was 2 normal in hydrogen ion, was contacted with hexone. A distribution factor of 1.3 resulted.

When a solution having the same composition as that just described was treated with iron powder prior to the contacting with hexone a distribution factor of 0.6 was obtained.

It is believed that the effect of treating the leach liquor with soluble silicon converts the tungsten values into heteropoly acids of silicon which may be represented as $H_4SiW_{12}O_{40}$. When an aqueous feed solution which was 3 normal in hydrogen ion and which contained 5 percent $H_4SiW_{12}O_{40}$ was contacted with hexone, complete extraction of the tungsten resulted.

In an example of the separation of molybdenum and tungsten by the process of the present invention, 170 milliliters of an aqueous solution containing 3.55 grams of tungsten and 0.236 gram of molybdenum, and containing the soluble silicon and soluble fluoride specified in the discussion, were acidified with hydrochloric acid. To the solution were added 0.11 gram of iron whereby the molybdenum was converted to the pentavalent state. The solution was then agitated with 170 milliliters of methylisobutyl ketone at room temperature. Two liquid phases were obtained. Analysis showed that the organic solvent extracted more tungsten than molybdenum and that a separation factor in excess of 30 was obtained in the single step procedure. These data are shown in Table I.

Table 1

| Organic Phase | Aqueous Phase | Separation Factor |
|---|---|---|
| | | $\left(\frac{W}{Mo}\right)$ organic phase |
| | | $\left(\frac{W}{Mo}\right)$ aqueous phase |
| Tungsten, g./l. 9.70 | 11.2 | 30.4 |
| Molybdenum, g./l. 0.0385 | 1.35 | |

Separation would be further improved by multistep extraction such as fractional extraction.

The molybdenum in the aqueous phase resulting from the separation technique previously described may be precipitated as calcium molybdate, molybdic oxide, or molybdenum disulfide by the addition of lime acid or sodium hydrosulfide respectively to the aqueous solution. The tungsten may be recovered from the organic phase by stripping the organic phase with water and precipitating calcium tungstate from the aqueous strip solution by the addition of lime.

A more efficient method for recovering the tungsten directly from the organic phase is by bubbling dry ammonia through the pregnant organic solvent; the tungsten values are precipitated directly therefrom as ammonium paratungstate which can be roasted to pure tungsten oxide ($WO_3$). The ammonia evolved during the roasting process may be recovered, purified and reused to separate additional tungsten values from the pregnant organic solvent. The tungsten trioxide may be reduced with hydrogen to pure tungsten. By this process the stripping procedure is unnecessary and the ammonia may be recycled thereby increasing the economy of operation. The process of removing the tungsten from the organic solvent by means of dry ammonia is described and claimed in copending application Serial No. 701,287, filed concurrently herewith.

In an example of this last described technique 900 milliliters of an aqueous solution treated according to the process of the present invention, having an acidity of 2.5 normal in hydrochloric acid, and containing 7.95 grams of tungsten and 0.8 gram of molybdenum, were agitated with 900 milliliters of methylisobutyl ketone at room temperature. The organic phase was decanted. Analysis indicated a tungsten content of 4.1 grams. Gaseous ammonia was blown through the organic solution. In two minutes all of the tungsten was precipitated as ammonium paratungstate.

What is claimed is:
1. A process for separating tungsten and molybdenum values from an aqueous solution containing these values as dissolved sodium tungstate and sodium molybdate, respectively, which comprises adding soluble silicon to the said aqueous solution when the mole ratio of soluble silicon to molybdenum plus tungsten is less than 1 to 12 and until there is a mole ratio of soluble silicon to molybdenum plus tungsten of at least 1 to 12, adding soluble fluoride to the said aqueous solution when the mole ratio of soluble fluoride to soluble silicon is less than 6 to 1 and until there is a mole ratio of soluble fluoride to soluble silicon of at least 6 to 1, acidifying said solution with at least one acid selected from the group consisting of hydrochloric acid, sulfuric acid, and phosphoric acid to a pH below about 6; contacting the acidified solution with a substantially water-immiscible organic solvent selected from the group consisting of lower aliphatic ketones and lower aliphatic-esters whereby tungsten values are transferred from the aqueous solution to the organic solvent; and separating the pregnant organic solvent from the aqueous solution.

2. A process in accordance with claim 1 wherein the soluble silicon and soluble fluoride are added to the aqueous solution prior to acidification as a water-soluble silicofluoride.

3. A process in accordance with claim 1 wherein the aqueous solution is acidified prior to extraction until the solution is at least about two normal in hydrogen ion.

4. A process in accordance with claim 1 wherein at least a substantial portion of the molybdenum values which are present in the acidified solution in the hexavalent state are reduced to the pentavalent state prior to extraction of the acidified solution.

5. A process for separating tungsten and molybdenum values from an aqueous solution containing these values as dissolved sodium tungstate and sodium molybdate, respectively, which comprises adding at least one water-soluble silicofluoride to said solution in an amount sufficient to give a mole ratio of soluble silicon to tungsten and molybdenum in said solution of at least 1 to 12; acidifying said solution with at least one acid selected from the group consisting of hydrochloric acid, sulfuric acid, and phosphoric acid until said solution is at least two normal in hydrogen ion; reducing at least a substantial portion of the molybdenum values which are present in the acidified solution in the hexavalent state to the pentavalent state; contacting said acidified solution with a substantially water-immiscible organic solvent selected from the group consisting of lower aliphatic ketones and lower aliphatic esters whereby tungsten values are transferred from the aqueous solution to the organic solvent; and separating the pregnant organic solvent from the aqueous solution.

References Cited in the file of this patent

UNITED STATES PATENTS

| 2,202,525 | Hixson et al. | May 28, 1940 |
| 2,556,255 | Carosella | June 12, 1951 |

OTHER REFERENCES

West in "Metallurgia," vol. 54, July 1956, pages 47 to 51.